US010984113B1

(12) United States Patent
Dhaliwal et al.

(10) Patent No.: US 10,984,113 B1
(45) Date of Patent: Apr. 20, 2021

(54) IDENTIFYING AND PROTECTING AGAINST A COMPUTER SECURITY THREAT WHILE PRESERVING PRIVACY OF INDIVIDUAL CLIENT DEVICES USING DIFFERENTIAL PRIVACY MACHINE LEARNING FOR STREAMING DATA

(71) Applicant: SYMANTEC CORPORATION, Mountain View, CA (US)

(72) Inventors: Jasjeet Dhaliwal, Morgan Hill, CA (US); Melanie Beck, Mountain View, CA (US); Aleatha Parker-Wood, Palo Alto, CA (US); Geoffrey So, Foster City, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 316 days.

(21) Appl. No.: 16/224,394

(22) Filed: Dec. 18, 2018

(51) Int. Cl.
*H04L 29/06* (2006.01)
*G06F 21/60* (2013.01)
*G06N 20/00* (2019.01)

(52) U.S. Cl.
CPC .............. *G06F 21/60* (2013.01); *G06N 20/00* (2019.01); *H04L 63/14* (2013.01)

(58) Field of Classification Search
None
See application file for complete search history.

(56) References Cited

U.S. PATENT DOCUMENTS

| 10,681,060 | B2* | 6/2020 | Scheidler | G06F 21/554 |
| 2013/0305357 | A1* | 11/2013 | Ayyagari | G06F 9/00 726/22 |
| 2016/0292592 | A1* | 10/2016 | Patthak | G06F 11/0766 |
| 2017/0214705 | A1* | 7/2017 | Gupta | H04L 63/1425 |
| 2018/0349605 | A1* | 12/2018 | Wiebe | G06N 3/08 |

(Continued)

OTHER PUBLICATIONS

Bonawitz, Keith et al. Practical Secure Aggregation for Privacy-Preserving Machine Learning. CCS '17: Proceedings of the 2017 ACM SIGSAC Conference on Computer and Communications Security. https://dl.acm.org/doi/pdf/10.1145/3133956.3133982 (Year: 2017).*

(Continued)

*Primary Examiner* — Jeremiah L Avery
(74) *Attorney, Agent, or Firm* — Maschoff Brennan

(57) ABSTRACT

Identifying and protecting against a computer security threat while preserving privacy of individual client devices using differential privacy machine learning for streaming data. In some embodiments, a method may include receiving first actual data values streamed from one or more first local client devices, generating first perturbed data values by adding noise to the first actual data values using a differential privacy mechanism, storing the first perturbed data values, training a machine learning classifier using the first perturbed data values, receiving a second actual data value streamed from a second local client device, generating a second perturbed data value by adding noise to the second actual data value, storing the second perturbed data value, identifying a computer security threat to the second local client device using the second actual data value as input to the trained machine learning classifier, and protecting against the computer security threat.

20 Claims, 4 Drawing Sheets

(56) References Cited

U.S. PATENT DOCUMENTS

2019/0068627 A1* 2/2019 Thampy .............. H04L 63/1425
2020/0050896 A1* 2/2020 Jayaraman ........... G06K 9/6228

OTHER PUBLICATIONS

Bindschaedler, Vincent et al. Achieving Differential Privacy in Secure Multiparty Data Aggregation Protocols on Star Networks. CODASPY '17: Proceedings of the Seventh ACM on Conference on Data and Application Security and Privacy. https://dl.acm.org/doi/pdf/10.1145/3029806.3029829 (Year: 2017).*

Friedman, A., & Schuster, A. (Jul. 2010). Data mining with differential privacy. In Proceedings of the 16$^{th}$ ACM SIGKDD international conference on Knowledge discovery and data mining (pp. 493-502). ACM.

Blum, A., Dwork, C., McSherry, F., & Nissim, K. (Jun. 2005). Practical privacy: the SuLQ framework. In Proceedings of the twenty-fourth ACM SIGMOD-Sigact-SIGART symposium on Principles of database systems (pp. 128-138). ACM.

Dwork, C. (2006). Differential privacy. In International Colloquium on Automata, Languages and Programming (pp. 1-12). Springer, Berlin, Heidelberg.

Dwork, C., McSherry, F., Nissim, K., & Smith, A. (Mar. 2006). Calibrating noise to sensitivity in private data analysis. In Theory of cryptography conference (pp. 265-284). Springer, Berlin, Heidelberg.

McSherry, F., & Talwar, K. (Oct. 2007). Mechanism design via differential privacy. In Foundations of Computer Science, 2007. FOCS'07. 48th Annual IEEE Symposium (pp. 94-103). IEEE.

Weggenmann B., & Kerschbaum F. (2018). SynTF: Synthetic and Differentially Private Term Frequency Vectors for Privacy-Preserving Text Mining. In arXiv preprint arXiv:1805.00904.

Dwork, C. (Apr. 2008). Differential privacy: A survey of results. In International Conference on Theory and Applications of Models of Computation (pp. 1-19). Springer, Berlin, Heidelberg.

Dwork, C., & Roth, A. (2014). The algorithmic foundations of differential privacy. In Foundations and Trends in Theoretical Computer Science, 9(3-4), 211-407.

Kenthapadi, K., Korolova, A., Mironov, I., & Mishra, N. (2012). Privacy via the johnson-lindenstrauss transform. In arXiv preprint arXiv: 1204.2606.

Blocki, J., Blum, A., Datta, A., & Sheffet, O. (Oct. 2012). The johnson-lindenstrauss transform itself preserves differential privacy. In Foundations of Computer Science (FOCS), 2012 IEEE 53rd Annual Symposium on (pp. 410-419). IEEE.

Xu, J., Zhang, Z., Xiao, X., Yang, Y., Yu, G., & Winslett, M. (2013). Differentially private histogram publication. In the VLDB Journal—The International Journal on Very Large Data Bases, 22(6), 797-822.

Agrawal, R., & Srikant, R. (2000). Privacy-preserving data mining (vol. 29, No. 2, pp. 439-450). ACM.

Jagannathan, G., Pillaipakkamnatt, K., & Wright, R. N. (Dec. 2009). A practical differentially private random decision tree classifier. In Data Mining Workshops, 2009. ICCDMW'09. IEEE International Conference on (pp. 114-121). IEEE.

Mohammed, N., Chen, R., Fung, B., & Yu, P. S. (Aug. 2011). Differentially private data release for data mining. In Proceedings of the 17th ACM SIGKDD international conference on Knowledge discovery and data mining (pp. 493-501). ACM.

Vaidya, J., & Clifton, C. (Aug. 2005). Privacy-preserving decision trees over vertically partitioned data. In IFIP Annual Conference on Data and Applications Security and Privacy (pp. 139-152). Springer, Berlin, Heidelberg.

Narayanan, A., & Shmatikov, V. (May 2008). Robust de-anonymization of large sparse datasets. In Security and Privacy, 2008. SP 2008. IEEE Symposium on (pp. 111-125). IEEE.

Dinur, I., & Nissim, K. (Jun. 2003). Revealing information while preserving privacy. In Proceedings of the twenty-second ACM SIGMOD-SIGACT-SIGART symposium on Principles of database systems (pp. 202-210). ACM.

Dwork, C., McSherry, F., & Talwar, K. (Jun. 2007). The price of privacy and the limits of LP decoding. In Proceedings of the thirty-ninth annual ACM symposium on Theory of computing (pp. 85-94). ACM.

Chen, T., & Guestrin, C. (2016, Aug.). Xgboost: A scalable tree boosting system. In Proceedings of the 22nd acm sigkdd international conference on knowledge discovery and data mining (pp. 785-794). ACM.

Pedregosa, F., Varoquaux, G., Gramfort, A., Michel, V., Thirion, B., Grisel, O.,& Vanderplas, J. (2011). Scikit-learn: Machine learning in Python. In Journal of machine learning research, 12(Oct.), 2825-2830.

Chaudhuri, K., Monteleoni, C., & Sarwate, A. D. (2011). Differentially private empirical risk minimization. Journal of Machine Learning Research, 12(Mar.), 1069-1109.

I. Guyon, "Design of experiments for the NIPS 2003 variable selection benchmark", 2003.

Zhu et al. "Differentially Private Query Learning: from Data Publishing to Model Publishing", Oct. 2017.

Papernot et al.; Privacy and machine learning: two unexpected allies; Apr. 29, 2018; located at http://www.cleverhans.io/privacy/2018/04/29/privacy-and-machine-learning.html; accessed on Dec. 14, 2018; 11 pages.

U.S. Appl. No. 16/224,416; titled "Identifying and Protecting Against A Computer Security Threat While Preserving Privacy of Individual Client Devices Using Differential Privacy for Text Documents"; filed Dec. 18, 2018; 46 pages.

* cited by examiner

IDENTIFYING AND PROTECTING AGAINST A COMPUTER SECURITY THREAT WHILE PRESERVING PRIVACY OF INDIVIDUAL CLIENT DEVICES USING DIFFERENTIAL PRIVACY MACHINE LEARNING FOR STREAMING DATA

BACKGROUND

Modern computers and computer networks are subject to a variety of security threats. For example, malware is software intentionally designed to cause damage to a computer or computer network. Malware typically does damage after it infects a targeted computer. In another example, a malicious application or rogue employee may attack a targeted computer in order to steal or otherwise misuse sensitive data stored on, or accessible to, the computer. Unfortunately, it can be difficult to detect security threats in order to limit or prevent harm to the targeted computer.

One method for detecting a security threat against a computer or computer network involves a security company collecting and analyzing data related to security threats from their customers' computers. Although a security company may benefit from collecting this data from their customers' computers, some customers may object to this collection of data as an invasion of privacy because the data may reveal sensitive information about the customers that the customers would rather keep private.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and protecting against a computer security threat while preserving privacy of individual client devices using differential privacy machine learning for streaming data may be at least partially performed by a remote server device including one or more processors. The method may include receiving, at the remote server device, first actual data values streamed from one or more first local client devices, generating, at the remote server device, first perturbed data values by adding noise to the first actual data values using a differential privacy mechanism, storing, at the remote server device, the first perturbed data values, training, at the remote server device, a machine learning classifier using the first perturbed data values stored at the remote server device, receiving, at the remote server device, a second actual data value streamed from a second local client device, generating, at the remote server device, a second perturbed data value by adding noise to the second actual data value using the differential privacy mechanism, storing, at the remote server device, the second perturbed data value, identifying, at the remote server device, a computer security threat to the second local client device using the second actual data value as input to the trained machine learning classifier, and in response to identifying the computer security threat, protecting against the computer security threat by directing performance, at the second local client device or the remote server device, of a remedial action to protect the second local client device from the computer security threat. In some embodiments, the performing, at the second local client device, of the remedial action may include one or more of blocking the second local client device from accessing a network, rolling back one or more changes at the second local client device that were made in response to the computer security threat, or temporarily freezing activity at the second local client device, or some combination thereof.

In some embodiments, the second actual data value may be used as input to the trained machine learning classifier without storing the second actual data value to prevent the second actual data value from being accessed at the remote server device.

In some embodiments, using the second actual data value instead of the second perturbed data value as input to the trained machine learning classifier may increase accuracy of the identifying of the computer security threat.

In some embodiments, the training, at the remote server device, of the machine learning classifier using the first perturbed data values stored at the remote server device may prevent the first actual data values from being exposed due to an explorative attack against the machine learning classifier.

In some embodiments, the method may further include sharing, at the remote server device, the first perturbed data values stored at the remote server device with other devices without revealing the first actual data values.

In some embodiments, the differential privacy mechanism may not be a local differential privacy mechanism.

In some embodiments, one or more non-transitory computer-readable media may include one or more computer-readable instructions that, when executed by one or more processors of a remote server device, cause the remote server device to perform a method for identifying and protecting against a computer security threat while preserving privacy of individual client devices using differential privacy machine learning for streaming data.

In some embodiments, a remote server device may include one or more processors and one or more non-transitory computer-readable media that include one or more computer-readable instructions that, when executed by the one or more processors, cause the remote server device to perform a method for identifying and protecting against a computer security threat while preserving privacy of individual client devices using differential privacy machine learning for streaming data.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
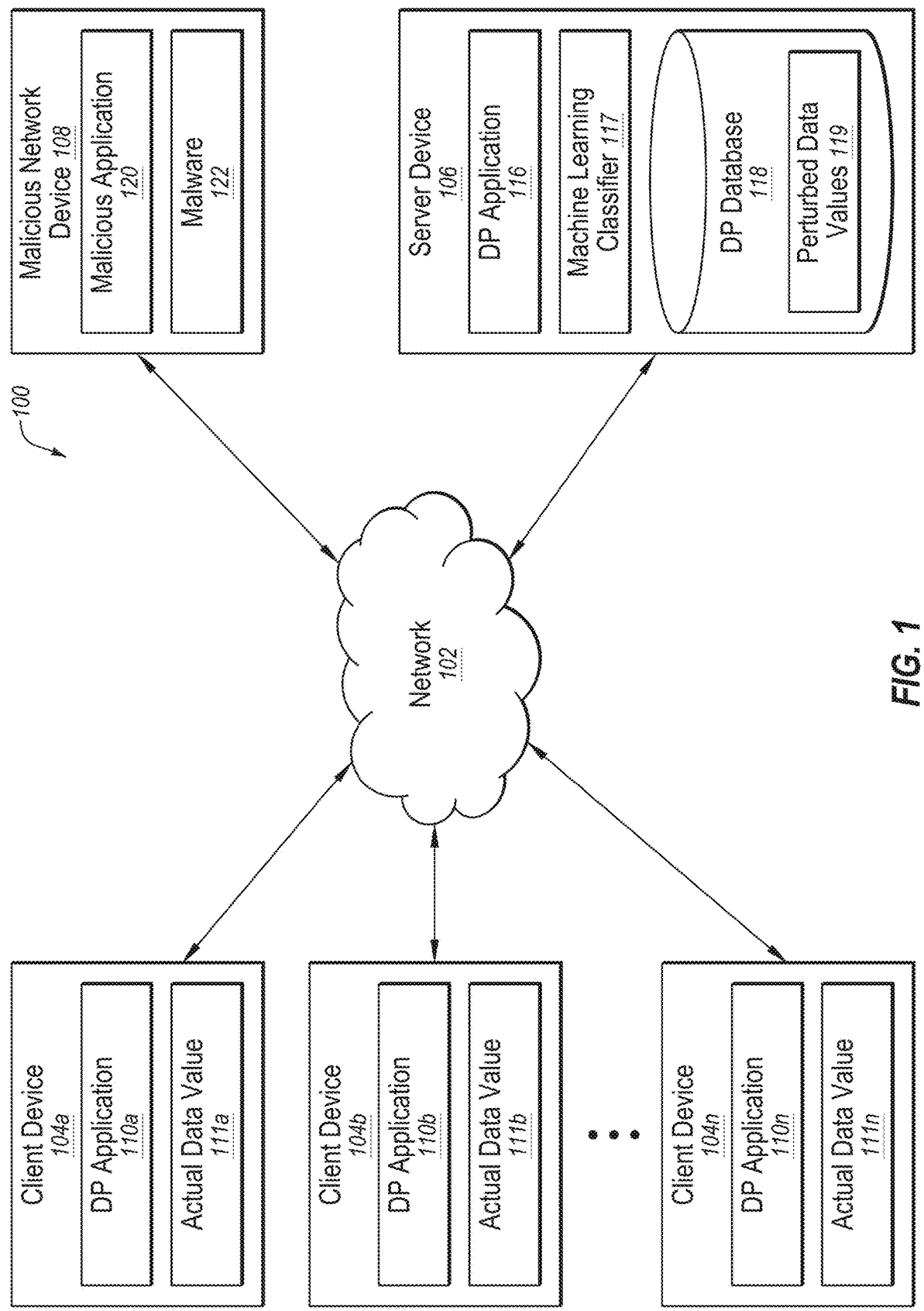
FIG. 1 illustrates an example system configured for identifying and protecting against a computer security threat while preserving privacy of individual client devices using differential privacy machine learning for streaming data.

Security threats to computers and computer networks can be difficult to detect. For example, when a malware infects a targeted computer, or when a malicious application or rogue employee attacks a targeted computer in order to steal or otherwise misuse sensitive data stored on, or accessible to, the computer, it can be difficult to detect the malware infection or the attack in order to limit or prevent harm to the targeted computer.

One method employed to detect a security threat against a computer or computer network involves a security company collecting data related to security threats from their customers' computers. However, some customers may object to this collection of data as an invasion of privacy because of the sensitive information that the data may reveal about the customers. For example, a customer may object to sharing data related to malware infections experienced by its computers, or data related to sensitive data stolen or otherwise misused on its computers, for fear that this information may be embarrassing if obtained by competitors or customers, or for fear that purveyors of the malware or malicious parties behind the attacks may obtain this information and use it to execute future attacks on the customer's computers. Therefore, although a security company may benefit from the collection of data from its customers' computers, the customers may feel that this collection of potentially sensitive data intrudes upon their privacy, and as such, they may not be comfortable with opting-in to this data collection unless their privacy can be protected.

One method a security company may employ to collect customer data, while offering some level of privacy guarantee to the customer, involves using local differential privacy (LDP). Using LDP, each customer locally perturbs or randomizes their actual data, and shares the perturbed version of their actual data with the security company. After observing a customer's perturbed data, the security company may not be able to infer or reverse-engineer the customer's actual data with strong confidence. Nevertheless, over large populations, the impact of perturbation and randomization may be expected to cancel out after the customers' perturbed or randomized data is aggregated, and therefore an analysis of the aggregated perturbed or randomized data may be able to accurately estimate aggregate statistics and trends pertaining to the whole population.

In some situations, customers may be willing to securely stream their actual data to a security company as long as their actual data is never stored or otherwise used in a way that could lead to their actual data being compromised by a malicious third party. For example, customers may want to avoid their actual data being used in a way that it may be exposed even if never directly stored, such as where their actual data is used to train a machine learning classifier and then an explorative attack against the machine learning classifier (e.g., against the server device on which the machine learning classifier is executing) uncovers or extracts the actual data that was used to train the machine learning classifier. In these situations, a security company may receive actual data values at a remote server that is streamed from customer computers, and then generate and store perturbed data values at the remote server using a differential privacy (DP) mechanism, while discarding the actual data values. The perturbed data values may then be used to train a machine learning classifier. The trained machine learning classifier may then receive as input another perturbed data value associated with a particular customer computer in order to allow the trained machine learning classifier to identify a security threat to the particular customer computer. Unfortunately, however, using a perturbed data value as an input to a trained machine learning classifier may yield a less accurate inferred decision than where the original actual data value is used as the input. Thus, a machine learning classifier that uses perturbed data values both in its training as well as in its inputs may protect the privacy of the original data values but may suffer in the accuracy of its inferred decisions, thus resulting, for example, in less accurate detection of a security threat to a targeted computer, resulting in increased harm to the targeted computer.

Some embodiments disclosed herein may provide various benefits. In particular, some embodiments disclosed herein may, for example, enable identifying and protecting against a computer security threat while preserving privacy of individual client devices using differential privacy machine learning for streaming data.

In some embodiments, a remote server device may receive actual data values securely streamed (over an encrypted channel such as an HTTPS connection, for example) from multiple local client devices, and then generate perturbed data values by adding noise to the actual data values using a differential privacy mechanism. The remote server may then store the perturbed data values in a database at the remote server, without ever storing the actual data values (e.g., by discarding the actual data values), thus preserving the privacy of the actual data values. The remote data server may then use the perturbed data values stored in the database to train a machine learning classifier at the remote server. Later, the remote server device may receive another actual data value securely streamed from a local client device. Without storing the actual data value, the remote server may use the actual data value as an input to the trained machine learning classifier to make an inferred decision, such as to identify a security threat to the local client device. The remote server may further generate a perturbed data value by adding noise to the actual data value using the differential privacy mechanism, and then store the perturbed data value in the database, without ever storing the actual data value (e.g., discarding the actual data value), thus preserving the privacy of the actual data value. Since the actual data value was used as the input to the trained machine learning classifier instead of the perturbed data value, the accuracy of the inferred decision made by the trained machine learning classifier may be higher than if the perturbed data value had been used as the input. Thus, where the inferred decision is an identification of a computer security threat to the local client device, this identification may be more accurate, which may allow for a remedial action to be performed to protect the local client device from the computer security threat, thus limiting or preventing harm to the local client device.

Although some embodiments of the methods disclosed herein are disclosed as being employed in connection with identifying and protecting against a computer security threat, it is understood that a computer security threat is only one of countless practical applications for the methods disclosed herein. For example, the methods disclosed herein may be employed in other practical applications where it is desirable to collect and aggregate data in a privacy-preserving manner, for example in order to entice customers to be willing to opt-in to data collection. These applications may include, but are not limited to, a security company gathering sensitive data from its customers such as device statistics, server logs, product telemetry, and other various security-related or non-security-related information. Therefore, the methods disclosed herein are not limited to being employed in connection with identifying and protecting against a computer security threat, but may also or instead be employed in any other practical application.

Turning to the figures, FIG. 1 illustrates an example system 100 configured for identifying and protecting against a computer security threat while preserving privacy of individual client devices using differential privacy machine learning for streaming data. The system 100 may include a network 102, client devices 104a-104n, a server device 106, and a malicious network device 108.

In some embodiments, the network 102 may be configured to communicatively couple the client devices 104a-104n, the server device 106, and the malicious network device 108 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
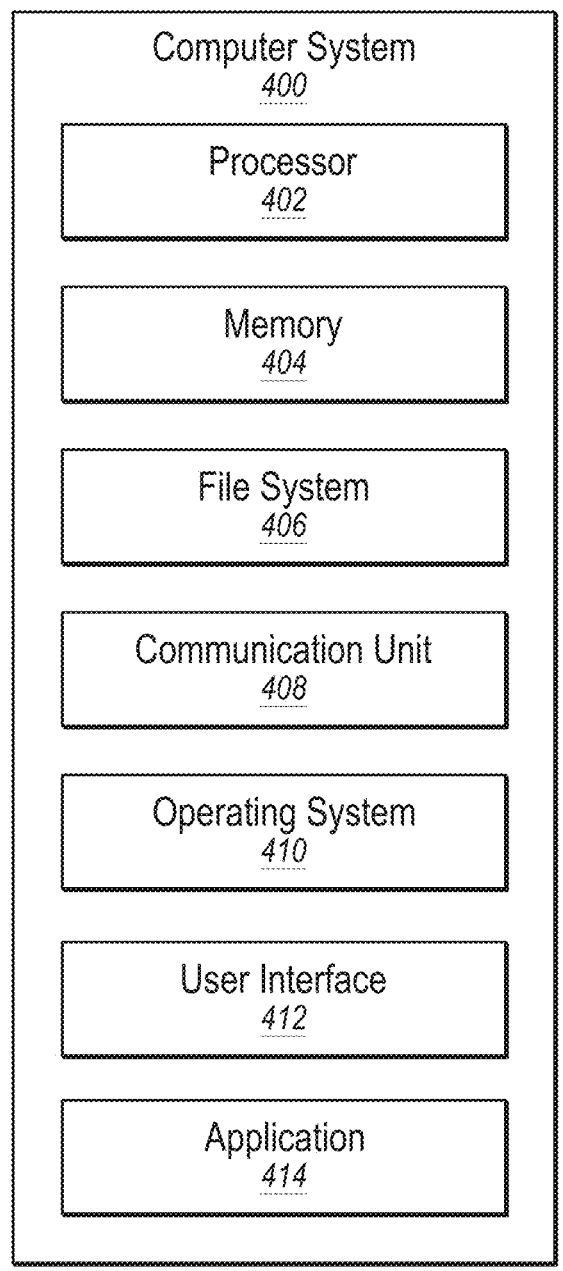
FIG. 4 illustrates an example computer system that may be employed in identifying and protecting against a computer security threat while preserving privacy of individual client devices using differential privacy machine learning for streaming data.

In some embodiments, the malicious network device 108 may be any computer system capable of communicating over the network 102 and capable of executing a malicious application 120 that attempts to infect other network devices with malware 122, or otherwise attack other network devices, examples of which are disclosed herein in connection with the computer system 400 of FIG. 4. In some embodiments, the malware 122 may be, or may include the functionality of, one or more of a spyware, a virus, a worm, a logic bomb, a trapdoor, a Trojan horse, a Remote Admin Trojan (RAT), a mobile malicious code, a malicious font, and a rootkit.

In some embodiments, each of the client devices 104a-104n may be any computer system capable of communicating over the network 102 and capable of executing a differential privacy (DP) application, examples of which are disclosed herein in connection with the computer system 400 of FIG. 4. The client devices 104a-104n may include DP applications 110a-110n, respectively. The DP applications 110a-110n may be configured to implement one or more actions of the methods disclosed herein. For example, the DP applications 110a-110n may be configured to access actual data values 111a-111n, and then send the actual data values 111a-111n to the server device 106, over a secure channel for example. In some embodiments, the actual data values 111a-111n may relate to one or more security threats against the client devices 104a-104n. An example of a computer security threat may include infection by the malware 122. Other examples of computer security threats may include an attack by the malicious application 120, or an attack by a rogue employee, that is intended to steal or otherwise misuse sensitive data stored on, or accessible to, one or more of the client devices 104a-104n.

In some embodiments, the server device 106 may be any computer system capable of communicating over the network 102 and capable of executing a DP application 116, examples of which are disclosed herein in connection with the computer system 400 of FIG. 4. The DP application 116 may be configured to implement one or more actions of the methods disclosed herein. For example, the DP application 116 may be configured to receive the actual data values 111a and 111b streamed from the client devices 104a and 104b, generate perturbed data values 119 by adding noise to the first actual data values using a differential privacy mechanism, store the perturbed data values 119 in a DP database 118, and then train a machine learning classifier 117 using the perturbed data values 119 stored in the DP database 118, all without storing the actual data values 111a and 111b, thus preserving the privacy of the actual data values 111a and 111b if the DP database 118 is attacked, and also thus preventing the actual data values 111a and 111b from being uncovered or extracted due to an explorative attack against the machine learning classifier 117. Although only two actual data values are used in this example, it is understood that many more actual data values may be employed, such as thousands or millions or billions of actual data values.

The DP application 116 may also be configured to receive the actual data value 111n streamed from the client device 104n, generate a perturbed data value by adding noise to the actual data value 111n using the differential privacy mechanism, and store the perturbed data value with the other perturbed data values 119 in the DP database 118. In addition, before the actual data value 111n is discarded from a transitory memory of the server device 106, the DP application 116 may also be configured to use the actual data value 111n as input to the trained machine learning classifier 117 to enable the trained machine learning classifier 117 to make an inferred decision, such as to identify a security threat to the client device 104n. Thus, the DP application 116 may store the perturbed data value with the other perturbed data values 119 in the DP database 118, and use the actual data value 111n as an input to the trained machine learning classifier 117, without ever storing the actual data value 111n at the server device 106, thus preserving the privacy of the actual data value 111n if the DP database 118 is attacked, and also thus preventing the actual data value 111n from being uncovered or extracted due to an explorative attack against the machine learning classifier 117. Further, since the actual data value 111n was used as the input to the trained machine learning classifier 117 instead of the perturbed data value, the accuracy of the inferred decision made by the trained machine learning classifier 117 may be higher than if the perturbed data value had been used as the input. Thus, where the inferred decision is an identification of a computer security threat to the client device 104n, this identification may be more accurate, which may allow for performance of a remedial action to protect the client device 104n from the computer security threat, thus limiting or preventing harm to the local client device 104n. This remedial action may include, for example, blocking the client device 104n from accessing the network 102 (e.g., to prevent the malicious application 120 from accessing the client device 104n over the network 102), rolling back one or more changes at the client device 104n that were made in response to the computer security threat (e.g., rolling back one or more changes made by the malware 122), or temporarily freezing activity at the client device 104n (e.g., to prevent the malicious application 120 or a rogue employee from stealing or otherwise misusing data at the client device 104n), or some combination thereof.

Therefore, the DP applications 110a-110n and 116 may cooperate to identify and protect against a computer security threat while preserving privacy of the individual client devices 104a-104n using differential privacy machine learning for streaming data. Unlike a machine learning classifier that uses perturbed data values both in its training as well as in its inputs, which may protect the privacy of the original data values but may suffer in the accuracy of its inferred decisions, the DP applications 110a-110n and 116 may employ the methods disclosed herein to use the perturbed data values 119 in the DP database 118 to train the machine learning classifier 117, but then use an actual data value (such as the actual data value 111n) as input to the trained machine learning classifier 117. This may enable the machine learning classifier 117 to make a more accurate inferred decision, such as a more accurate inferred decision that identifies a security threat to the client device 104n, which may allow for performance of a remedial action to protect the client device 104n from the computer security threat, thus limiting or preventing harm to the client device 104n.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
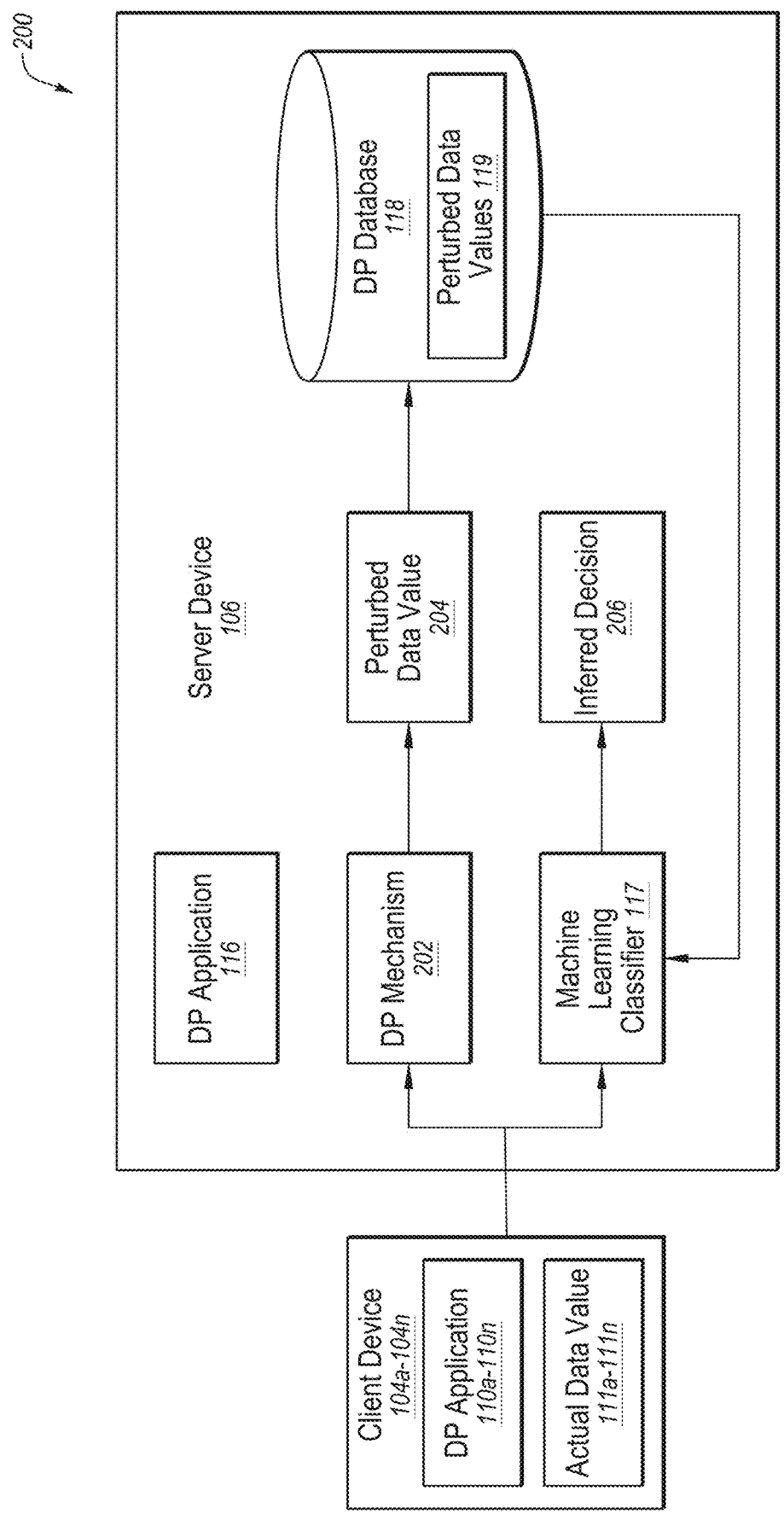
FIG. 2 is a flowchart illustrating aspects of differential privacy machine learning for streaming data.

FIG. 2 is a flowchart 200 illustrating aspects of differential privacy machine learning for streaming data. In particular, the flowchart 200 discloses that the DP application 116 at the server device 106 may receive actual data values, such as the actual data values 111a and 111b, streamed from multiple client devices, such as the client devices 104a and 104b. After each actual data value is received, the DP application 116 may use a DP mechanism 202 on each data value to generate a perturbed data value 204 by adding noise to the actual data value. The DP application 116 may then store the perturbed data value 204 in the DP database 118. Eventually after a sufficient number of perturbed data values 119 are stored in the DP database 118, the DP application 116 may train the machine learning classifier 117 using the perturbed data values 119 as training data. All this is done without ever storing the actual data values 111a and 111b at the server device 106, thus preserving the privacy of the actual data values 111a and 111b if the DP database 118 is attacked, and also thus preventing the actual data values 111a and 111b from being uncovered or extracted due to an explorative attack against the machine learning classifier 117. Although only two actual data values are used in this example, it is understood that many more actual data values may be employed, such as thousands or millions or billions of actual data values.

The flowchart 200 also discloses that the DP application 116 at the server device 106 may also receive an actual data value from another client device, such as the actual data value 111n streamed from the client device 104n. After the actual data value is received, the DP application 116 may use the DP mechanism 202 on the data value to generate a perturbed data value 204 by adding noise to the actual data value 111n, and then store the perturbed data value 204 in the DP database 118 along with the other perturbed data values 119 that were previously stored in the DP database 118. In addition, before the actual data value 111n is discarded from a transitory memory of the server device 106, the DP application 116 may also use the actual data value 111n as input to the trained machine learning classifier 117 to enable the trained machine learning classifier 117 to make an inferred decision 206, such as to identify a security threat to the client device 104n. Thus, the DP application 116 may store the perturbed data value with the other perturbed data values 119 in the DP database 118, and use the actual data value 111n as an input to the trained machine learning classifier 117 to make the inferred decision 206, without ever storing the actual data value 111n at the server device 106, thus preserving the privacy of the actual data value 111n if the DP database 118 is attacked, and also thus preventing the actual data value 111n from being uncovered or extracted due to an explorative attack against the machine learning classifier 117. Further, since the actual data value 111n was used as the input to the trained machine learning classifier 117 instead of the perturbed data value 204, the accuracy of the inferred decision 206 made by the trained machine learning classifier 117 may be higher than if the perturbed data value 204 had been used as the input. Thus, where the inferred decision 206 is an identification of a computer security threat to the client device 104n, this identification may be more accurate, which may allow for performance of a remedial action to protect the client device 104n from the computer security threat, thus limiting or preventing harm to the local client device 104n.

Therefore, the DP application 116 may identify and protect against a computer security threat while preserving privacy of the individual client devices 104a-104n using differential privacy machine learning for streaming data. Unlike a machine learning classifier that uses perturbed data values both in its training as well as in its inputs, which may protect the privacy of the original data values but may suffer in the accuracy of its inferred decisions, the DP application 116 may employ the methods disclosed herein to use the perturbed data values 119 in the DP database 118 to train the machine learning classifier 117, but then use an actual data value (such as the actual data value 111n) as input to the trained machine learning classifier 117. This may enable the machine learning classifier 117 to make a more accurate inferred decision, such as a more accurate inferred decision that identifies a security threat to the client device 104n, which may allow for a remedial action to protect the client device 104n from the computer security threat, thus limiting or preventing harm to the client device 104n.

In some embodiments, the motivating insight behind the DP mechanism 202 may be that if an adversary cannot ascertain whether or not a particular client device has data values stored in the DP database 118, no additional information about that client device is leaked by its participation. Further, the DP mechanism 202 may capture precisely how likely the adversary is to ascertain whether a client device participated in the DP database 118.

In some embodiments, a formalized definition of the DP mechanism 202 may include the notion of neighboring databases, as follows:

Definition 1 (Neighboring databases): Given an input space $\mathcal{X}$, we can represent the database with n entries, $X \in \mathcal{X}^n$ as $X \in \mathbb{N}^{|\mathcal{X}|}$, such that $\|X\|_1 = n$ and there are a total of $|\mathcal{X}|$ "types" of entries in the input space. Two databases $X_1, X_2 \in \mathbb{N}^{|\mathcal{X}|}$ are neighbors if $\|X_1 - X_2\|_1 = 1$. That is, the two databases differ by exactly one entry.

Definition 2 (Probability Simplex): Given a set Y, the probability simplex over Y is defined as:

$$\Delta Y = \left\{ y \in \mathbb{R}^{|Y|} : y_i \geq 0, \sum_{i=1}^{|Y|} = 1 \right\}.$$

Definition 3 (Randomization Mechanism): Given two sets $\mathcal{X}$, Y, a randomization mechanism is a $\mathcal{M}: \mathcal{X} \to \Delta Y$. Thus, a randomization mechanism defines a probability distribution over the set Y. Given an input $x \in \mathcal{X}$, a randomization mechanism $\mathcal{M}$, maps x to $\mathcal{Y} \in Y$ with probability $(\mathcal{M}(x))\mathcal{Y}$, which is the probability for element y under the distribution (M(x)).

Definition 4 (Differential Privacy): For an $\varepsilon \in (0,1)$, and $\delta \varepsilon [0,1)$, a randomization mechanism $\mathcal{M}$ is $(\varepsilon, \delta)$ differentially private on domain $\mathcal{X}$ if for two neighboring databases $X_1$, $X_2$: $P[\mathcal{M}(X_1) \subseteq D] \leq e^{\varepsilon} P[\mathcal{M}(X_2) \subseteq D] + \delta$.

The above definition says that if a randomization mechanism maps two neighboring databases to the same set with probabilities that are within $e^{\varepsilon}$ factor and an additive $\delta$ factor of each other, then the randomization mechanism provides $(\varepsilon, \delta)$ privacy.

Differential privacy may be further divided into two sub-categories: interactive and non-interactive. In the interactive setting, a third party can only access the data by sending queries to a database access mechanism where the database access mechanism acts as a randomization mechanism. Upon receiving such a query, the database access mechanism evaluates the query on the dataset, adds randomness to the answer and sends this answer back to the third party. By randomizing the query response, the database access mechanism ensures that the answer is differentially private. However, in this setting, the system still has the underlying data, and a breach of database security will still lead to privacy loss. Some embodiments herein, therefore, focus on the non-interactive setting, in which there is no such database access mechanism. Instead, the randomization mechanism makes publicly available a randomized version of a given database that is differentially private.

The flowchart 200 of FIG. 2 may include a system design which exploits the insight that non-interactive differential privacy guarantees must be provided on stored data and that inference on streaming data can be completed before storing the data. For example, the system design of FIG. 2 may train a given machine learning classifier on differentially private training data, and then performs inference on streaming data using its non-differentially private representation. It may then store this streaming data in a differentially private manner in order to guarantee privacy on the stored data. Since the classification system is performing inference on the representation of the data that does not have any random noise added to it, the system can extract more accurate information from the representation and hence achieve better performance.

The DP mechanism 202 of FIG. 2 may focus on the case where the input space is defined as $\mathcal{X} \subseteq \mathbb{R}^d$, and a database with n entries, $X \in \mathcal{X}^n$ can be represented as a matrix $X \in \mathbb{R}^{n \times d}$. We may define two databases X, X' to be neighbors if they differ in exactly one row. We may use any DP mechanism to guarantee differential privacy. For example, two standard randomization mechanisms that guarantee differential privacy are a Gaussian Mechanism and a Laplacian Mechanism.

Gaussian Mechanism: For any given, $X \in \mathbb{R}^{n \times d}$, the Gaussian Mechanism is a function $\mathcal{G}: \mathbb{R}^{n \times d} \to \mathbb{R}^{n \times d}$ defined by $\mathcal{G}(\mathcal{X}) = \mathcal{X} + \Delta$, where $\Delta \varepsilon \mathbb{R}^{n \times d}$, and $\Delta_{ij} \sim N(\mu, \sigma^2)$, where $\mu$, $\sigma^2$ are parameters of the Normal Distribution.

Theorem 1: Let $\delta \varepsilon (0,1)$ be arbitrary. For $$c^2 > 2 \ln\left(\frac{1.25}{\delta}\right),$$

the Gaussian Mechanism with parameter $$\sigma \geq c \frac{\Delta \mathcal{X}}{\epsilon}$$

is $(\in, \delta)$-differentially private where $\Delta X = \|X - X'\|_2$ for two neighboring databases X and X'.

Laplacian Mechanism: For any given, $X \in \mathbb{R}^{n \times d}$, the Laplacian Mechanism is a function $\mathcal{L}: \mathbb{R}^{n \times d} \to \mathbb{R}^{n \times d}$ defined by $\mathcal{L}(\mathcal{X}) = \mathcal{X} + \Delta$, where $\Delta \in \mathbb{R}^{n \times d}$, and $\Delta_{ij} \sim \text{Lap}$, where $\mu$, b are parameters of the Laplacian Distribution.

Theorem 2: Let $\epsilon \in (0,1)$ be arbitrary. For $$\mu = 0, b = \frac{\Delta X}{\epsilon},$$

the Laplacian Mechanism is $(\epsilon, \delta)$-differentially private where $\Delta X = \|X - X'\|_1$ for two neighboring databases X and X'.

The flowchart 200 of FIG. 2 may include a system architecture where we discuss privacy when the input space is defined as $\mathcal{X} \subseteq \mathbb{R}^d$ for maximum generality. Without loss of generality, consider the case where we have n training samples; our training database then is a matrix $\mathcal{X} \in \mathbb{R}^{n \times d}$. We first pass the matrix X through a differentially private randomization mechanism (such as the DP mechanism 202 of FIG. 2) and then train a machine learning classifier f (such as the machine learning classifier 117) on this differentially private data such that f: $\mathbb{R}^d \to \{$class A, class B$\}$. Given an incoming sample, $x \in \mathbb{R}^d$, we pass x to the classifier f which classifies it as class A or class B. This allows the classifier f to make a decision on the pre-noise representation of the input. However, before storing the sample, we pass it through a differentially private randomization mechanism (such as the DP mechanism 202 of FIG. 2). In doing so, we are able to improve the performance of the classifier f during inference while also preserving differential privacy on the stored data.

Modifications, additions, or omissions may be made to the flowchart 200 without departing from the scope of the present disclosure. In some embodiments, the flowchart 200 may include additional components similar to the components illustrated in FIG. 2 that each may be configured similarly to the components illustrated in FIG. 2.

Figure 3:
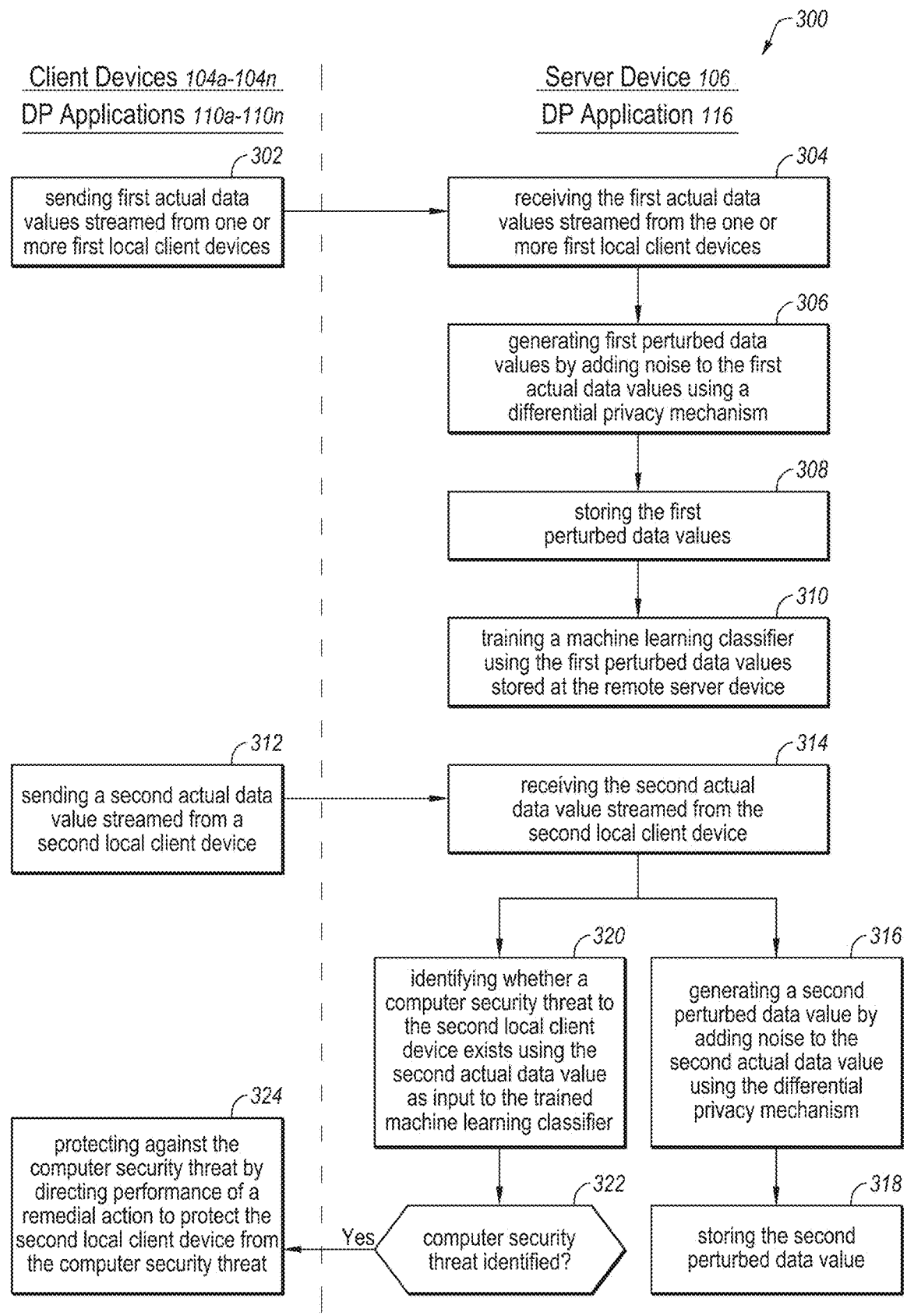
FIG. 3 is a flowchart of an example method for identifying and protecting against a computer security threat while preserving privacy of individual client devices using differential privacy machine learning for streaming data.

FIG. 3 is a flowchart of an example method 300 for identifying and protecting against a computer security threat while preserving privacy of individual client devices using differential privacy machine learning for streaming data. The method 300 may be performed, in some embodiments, by one or more applications, devices, or systems, such as by the DP applications 110a-110n and 116 of FIG. 1, or some other application(s), or some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, sending and, at action 304, receiving first actual data values streamed from one or more first local client devices. For example, the DP applications 110a and 110b may send, at action 302, and the DP application 116 may receive, at action 304, the actual data values 111a and 111b securely streamed from the client devices 104a and 104b.

The method 300 may include, at action 306, generating first perturbed data values by adding noise to the first actual data values using a differential privacy mechanism. In some embodiments, the differential privacy mechanism may not be a local differential privacy mechanism. For example, the DP application 116 may generate, at action 306, perturbed data values 119 by adding noise to the actual data values 111a and 111b using the DP mechanism 202. Further, since the DP mechanism 202 is located remotely at the server device 106 instead of being located locally at the client devices 104a and 104b, the DP mechanism 202 is not a "local" differential privacy mechanism, but may instead be considered to be a "remote" differential privacy mechanism with respect to the client devices 104a and 104b.

The method 300 may include, at action 308, storing the first perturbed data values in a database. In some embodiments, the method 300 may further include sharing, at the remote server device, the first perturbed data values stored in the database with other devices without revealing the first actual data values. For example, the DP application 116 may store, at action 308, the perturbed data values 119 in the DP database 118. Further, the DP application 116 may share the perturbed data values 119 stored in the DP database 118 with other devices (such as with any of the client devices 104a-104n or other network devices) without revealing the actual data values 111a and 111b that were used to generate the perturbed data values 119.

The method 300 may include, at action 310, training a machine learning classifier using the first perturbed data values stored in the database. In some embodiments, the training, at action 310, of the machine learning classifier using the first perturbed data values stored in the database prevents the first actual data values from being exposed due to an explorative attack against the machine learning classifier. For example, the DP application 116 may train, at action 310, the machine learning classifier 117 using the perturbed data values 119 stored in the DP database 118.

Although only two actual data values are used in the examples in connection with actions 302-310, it is understood that many more actual data values may be employed, such as thousands or millions or billions of actual data values.

The method 300 may include, at action 312, sending and, at action 314, receiving a second actual data value streamed from a second local client device. For example, the DP application 110n may send, at action 312, and the DP application 116 may receive, at action 314, the actual data value 111n streamed from the client device 104n.

The method 300 may include, at action 316, generating a second perturbed data value by adding noise to the second actual data value using the differential privacy mechanism. For example, the DP application 116 may generate, at action 316, a perturbed data value 204 by adding noise to the actual data value 111n using the DP mechanism 202.

The method 300 may include, at action 318, storing the second perturbed data value in the database. For example, the DP application 116 may store, at action 318, the perturbed data value 204 in the DP database 118 along with the previously-stored perturbed data values 119.

The method 300 may include, at action 320, identifying whether a computer security threat to the second local client device exists using the second actual data value as input to the trained machine learning classifier. If so (Yes at action 322), the method 300 may include, at action 324, protecting against the computer security threat by directing performance of a remedial action to protect the second local client device from the computer security threat. In some embodiments, the performing of the remedial action at the local client device may include one or more of blocking the second local client device from accessing a network, rolling back one or more changes at the second local client device that were made in response to the computer security threat, or temporarily freezing activity at the second local client device, or some combination thereof. For example, the DP application 116 may identify, at action 320, whether a computer security threat to the client device 104n exists using the actual data value 111n as input to the trained machine learning classifier 117. If so, the DP application 116 may protect, at action 324, against the computer security threat by directing performance of a remedial action to protect the client device 104n from the computer security threat. In this example, the remedial action may include blocking the client device 104n from accessing the network 102, rolling back one or more changes at the client device 104n that were made in response to the security threat, or temporarily freezing activity at the client device 104n, or some combination thereof. In some embodiments, the remedial action may additionally or alternatively involve an action at a server device, such as blocking an email at an email server device where the email is determined to involve spam and/or spear phishing.

In some embodiments, the second actual data value may be used, at action 320, as input to the trained machine learning classifier without storing the second actual data value to prevent the second actual data value from being accessed at the remote server device. Further, in some embodiments, using, at action 320, the second actual data value, instead of the second perturbed data value, as input to the trained machine learning classifier increases accuracy of the identifying of the computer security threat. For example, using, at action 320, the actual data value 111n as input to the trained machine learning classifier 117, without storing the actual data value 111n, may prevent the actual data value 111n from being accessed at the server device 106, for example if a malicious third party were to gain unauthorized access to the server device 106. Further, using, at action 320, the actual data value 111n, instead of the perturbed data value 204 that is generated from the actual data value 111n, as input to the trained machine learning classifier 117 may increase accuracy of the identifying of the computer security threat.

In some embodiments, the method 300 may result in identifying and protecting against a computer security threat while preserving privacy of the individual client devices 104a-104n using differential privacy machine learning for streaming data. Unlike a machine learning classifier that uses perturbed data values both in its training as well as in its inputs, which may protect the privacy of the original data values but may suffer in the accuracy of its inferred decisions, the method 300 may use the perturbed data values 119 in the DP database 118 to train the machine learning classifier 117, but then use an actual data value (such as the actual data value 111n) as input to the trained machine learning classifier 117. This may enable the machine learning classifier 117 to make a more accurate inferred decision, such as a more accurate inferred decision that identifies a security threat to the client device 104n, which may allow for a remedial action to protect the client device 104n from the computer security threat, thus limiting or preventing harm to the client device 104n.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 314-320 may be performed without performing other actions of the method 300. Also, in some embodiments, actions 314-324 may be performed without performing other actions of the method 300. Also, the action 320 may be performed to make an inferred decision other than identifying whether a security threat to a client device exists. Further, in some embodiments, any of action 320, action 322, or action 324 may be performed by a network administrator or other entity that is different from the entity or entities performing the other actions of the method 300.

Further, it is understood that the method 300 may improve the functioning of a network device itself, and improve the technical field of differential privacy, such as where differential privacy is employed in identifying and protecting against a computer security threat. For example, the functioning of the client devices 104a-104n and the server device 106 may themselves be improved by the method 300, by identifying and protecting against a security threat while preserving privacy of the individual client devices 104a-104n using differential privacy machine learning for streaming data. Unlike some differential privacy methods which use perturbed data values for training data and inputs for a machine learning classifier, the method 300 may use perturbed data values for training but use actual data values for input to the machine learning classifier 117. This may enable the machine learning classifier 117 to make a more accurate inferred decision 206, such as a more accurate inferred decision 206 that identifies a security threat to the client device 104n, which may allow for performance of a remedial action to protect the client device 104n from the computer security threat, thus limiting or preventing harm to the client device 104n.

FIG. 4 illustrates an example computer system 400 that may be employed in identifying and protecting against a computer security threat while preserving privacy of individual client devices using differential privacy machine learning for streaming data. In some embodiments, the computer system 400 may be part of any of the systems or devices described in this disclosure. For example, the computer system 400 may be part of any of the client devices 104a-104n, the server device 106, or the malicious network device 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIG. 3. These computer-executable instructions may be included, for example, in the operating system 410, in one or more applications, such as in any of the DP applications 110a-110n or 116 or the malicious application 120 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIG. 3. In some embodiments, the application 414 may be part of the operating system 410 or may be part of an application of the computer system 400, or may be some combination thereof. In some embodiments, the application 414 may function as any of the DP applications 110a-110n or 116 or the malicious application 120 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against a computer security threat while preserving privacy of individual client devices using differential privacy machine learning for streaming data, at least a portion of the method being performed by a remote server device comprising one or more processors, the method comprising:

receiving, at the remote server device, first actual data values streamed from one or more first local client devices;

generating, at the remote server device, first perturbed data values by adding noise to the first actual data values using a differential privacy mechanism;

storing, at the remote server device, the first perturbed data values;

training, at the remote server device, a machine learning classifier using the first perturbed data values stored at the remote server device;

receiving, at the remote server device, a second actual data value streamed from a second local client device;

generating, at the remote server device, a second perturbed data value by adding noise to the second actual data value using the differential privacy mechanism;

storing, at the remote server device, the second perturbed data value;

identifying, at the remote server device, a computer security threat to the second local client device using the second actual data value as input to the trained machine learning classifier; and in response to identifying the computer security threat, protecting against the computer security threat by directing performance, at the second local client device or the remote server device, of a remedial action to protect the second local client device from the computer security threat.

2. The method of claim 1, wherein the performing, at the second local client device, of the remedial action comprises one or more of blocking the second local client device from accessing a network, rolling back one or more changes at the second local client device that were made in response to the computer security threat, or temporarily freezing activity at the second local client device, or some combination thereof.

3. The method of claim 1, wherein the second actual data value is used as input to the trained machine learning classifier without storing the second actual data value to prevent the second actual data value from being accessed at the remote server device.

4. The method of claim 1, wherein using the second actual data value instead of the second perturbed data value as input to the trained machine learning classifier increases accuracy of the identifying of the computer security threat.

5. The method of claim 1, wherein the training, at the remote server device, of the machine learning classifier using the first perturbed data values stored at the remote server device prevents the first actual data values from being exposed due to an explorative attack against the machine learning classifier.

6. The method of claim 1, further comprising sharing, at the remote server device, the first perturbed data values stored at the remote server device with other devices without revealing the first actual data values.

7. The method of claim 1, wherein the differential privacy mechanism is not a local differential privacy mechanism.

8. One or more non-transitory computer-readable media comprising one or more computer-readable instructions that, when executed by one or more processors of a remote server device, cause the remote server device to perform a method for identifying and protecting against a computer security threat while preserving privacy of individual client devices using differential privacy machine learning for streaming data, the method comprising:

receiving, at the remote server device, first actual data values streamed from one or more first local client devices;

generating, at the remote server device, first perturbed data values by adding noise to the first actual data values using a differential privacy mechanism;

storing, at the remote server device, the first perturbed data values;

training, at the remote server device, a machine learning classifier using the first perturbed data values stored at the remote server device;

receiving, at the remote server device, a second actual data value streamed from a second local client device;

generating, at the remote server device, a second perturbed data value by adding noise to the second actual data value using the differential privacy mechanism;

storing, at the remote server device, the second perturbed data value at the remote server device;

identifying, at the remote server device, a computer security threat to the second local client device using the second actual data value as input to the trained machine learning classifier; and in response to identifying the computer security threat, protecting against the computer security threat by directing performance, at the second local client device or the remote server device, of a remedial action to protect the second local client device from the computer security threat.

9. The one or more non-transitory computer-readable media of claim 8, wherein the performing, at the second local client device, of the remedial action comprises one or more of blocking the second local client device from accessing a network, rolling back one or more changes at the second local client device that were made in response to the computer security threat, or temporarily freezing activity at the second local client device, or some combination thereof.

10. The one or more non-transitory computer-readable media of claim 8, wherein the second actual data value is used as input to the trained machine learning classifier without storing the second actual data value to prevent the second actual data value from being accessed at the remote server device.

11. The one or more non-transitory computer-readable media of claim 8, wherein using the second actual data value instead of the second perturbed data value as input to the trained machine learning classifier increases accuracy of the identifying of the computer security threat.

12. The one or more non-transitory computer-readable media of claim 8, wherein the training, at the remote server device, of the machine learning classifier using the first perturbed data values stored at the remote server device prevents the first actual data values from being exposed due to an explorative attack against the machine learning classifier.

13. The one or more non-transitory computer-readable media of claim 8, wherein the method further comprises sharing, at the remote server device, the first perturbed data values stored at the remote server device with other devices without revealing the first actual data values.

14. The one or more non-transitory computer-readable media of claim 8, wherein the differential privacy mechanism is not a local differential privacy mechanism.

15. A remote server device comprising:

one or more processors; and one or more non-transitory computer-readable media comprising one or more computer-readable instructions that, when executed by the one or more processors, cause the remote server device to perform a method for identifying and protecting against a computer security threat while preserving privacy of individual client devices using differential privacy machine learning for streaming data, the method comprising:

receiving, at the remote server device, first actual data values streamed from one or more first local client devices;

generating, at the remote server device, first perturbed data values by adding noise to the first actual data values using a differential privacy mechanism;

storing, at the remote server device, the first perturbed data values;

training, at the remote server device, a machine learning classifier using the first perturbed data values stored at the remote server device;

receiving, at the remote server device, a second actual data value streamed from a second local client device;

generating, at the remote server device, a second perturbed data value by adding noise to the second actual data value using the differential privacy mechanism;

storing, at the remote server device, the second perturbed data value at the remote server device;

identifying, at the remote server device, a computer security threat to the second local client device using the second actual data value as input to the trained machine learning classifier; and in response to identifying the computer security threat, protecting against the computer security threat by directing performance, at the second local client device or the remote server device, of a remedial action to protect the second local client device from the computer security threat.

16. The remote server device of claim 15, wherein the performing, at the second local client device, of the remedial action comprises one or more of blocking the second local client device from accessing a network, rolling back one or more changes at the second local client device that were made in response to the computer security threat, or temporarily freezing activity at the second local client device, or some combination thereof.

17. The remote server device of claim 15, wherein:
the second actual data value is used as input to the trained machine learning classifier without storing the second actual data value to prevent the second actual data value from being accessed at the remote server device; and using the second actual data value instead of the second perturbed data value as input to the trained machine learning classifier increases accuracy of the identifying of the computer security threat.

18. The remote server device of claim 15, wherein the training, at the remote server device, of the machine learning classifier using the first perturbed data values stored at the remote server device prevents the first actual data values from being exposed due to an explorative attack against the machine learning classifier.

19. The remote server device of claim 15, wherein the method further comprises sharing, at the remote server device, the first perturbed data values stored at the remote server device with other devices without revealing the first actual data values.

20. The remote server device of claim 15, wherein the differential privacy mechanism is not a local differential privacy mechanism.

* * * * *